June 3, 1958 E. JOYET ET AL 2,836,889
CUTTING ROLLER FOR CULINARY AND LIKE USES
Filed Feb. 20, 1956 2 Sheets-Sheet 1

INVENTOR.
ERIC JOYET
HANS KOCH
BY *Walter S. Pleston*
ATTORNEY

June 3, 1958 E. JOYET ET AL 2,836,889
CUTTING ROLLER FOR CULINARY AND LIKE USES
Filed Feb. 20, 1956 2 Sheets-Sheet 2

INVENTOR.
ERIC JOYET
HANS KOCH
BY Walter S. Heston
ATTORNEY

United States Patent Office 2,836,889
Patented June 3, 1958

2,836,889

CUTTING ROLLER FOR CULINARY AND LIKE USES

Eric Joyet, Lausanne, Switzerland, and Hans Koch, Munich-Pasing, Germany, assignors to F. Ritter & Sohn, Munich-Pasing, Germany Application February 20, 1956, Serial No. 566,729

Claims priority, application Germany March 17, 1955

3 Claims. (Cl. 30—307)

The invention relates to the construction of cutting rollers having a plurality of rotatable circular blades of thin sheet steel each held as far as the vicinity of their periphery between reinforcing discs, said discs simultaneously determining the spacing of the blades. Such cutting rollers are used principally as culinary appliances. In known appliances, the blades consist of hard chromium plated sheet steel, whereas the reinforcing members are formed by tin-plated iron discs having annular grooves. The shaft of the known cutting rollers may also consist of iron or of any other metal, such as light metal. With such cutting rollers one blade and two reinforcing discs, disposed with their hub portions in juxtaposition, alternate in each case along the shaft. Both ends of the shaft are provided with clamping discs for the lateral compaction and securing of the cutting members.

It has become apparent in practice that such cutting rollers are subjected to comparatively severe corrosion, although they are usually washed and dried after each use. Tests have shown that the corrosion is probably mainly due to the formation of local galvanic elements, due to the different metals used in the construction of the cutter roller, i. e. iron, tin, chromium and aluminium, which are in mutual contact in a damp condition.

The object of the present invention is to remove this disadvantage and to considerably increase the life of such cutting rollers, having chromium-plated or non-chromium plated blades. It is also an object to achieve further advantages, particularly an increase in the strength and the reliability of the blade attachments, simpler cleaning and a reduction in weight.

According to the present invention, in a cutter roller for culinary and like uses having a plurality of rotatable circular blades of thin sheet steel each held as far as the vicinity of its periphery between reinforcing discs which have enlarged hub portions forming distance pieces between adjacent blades, the reinforcing discs between the individual blades consist of plastic synthetic material. Preferably, a synthetic material which is stable even at temperatures about and above 100° C. and does not soften is used, so that the cutting roller can be washed in hot water without hesiltation and also dried at a corresponding temperature.

Further features of the invention consist in preferred forms of construction and shape of the reinforcing discs made of synthetic material. In one embodiment these discs are shaped so that adjacent reinforcing discs are arranged closely together by the provision of co-operating plane surfaces in the vicinity of their hubs, whereas the marginal areas are slightly bevelled so that the reinforcing discs abut the blades resiliently.

With cutting rollers constructed according to the invention, the risk of rusting is reduced to a minimum. The weight of the cutting rollers is greatly reduced. This also has an indirectly favourable effect in that the risk, for example, of breaking the casing of such cutting rollers, said casing frequently consisting of thin synthetic material, is reduced when they fall on the floor, due to the low overall weight. Cleaning is facilitated by the fact that the reinforcing discs of synthetic material have a completely smooth surface. For the same reason, close abutment against the blades is achieved so that the penetration of liquid or very small cuttings between the blades and the reinforcing discs is avoided, this being of the greatest importance for reasons of hygiene.

According to a further embodiment of the invention, each of the blades is cast or pressed into a hub of synthetic material which forms the reinforcing discs, covers and supports the blades on both sides as far as the vicinity of their periphery, and is enlarged in the region of the roller spindle to form a hub portion. At the same time parts of the synthetic hub adjacent to the spindle are preferably so constructed that on one end an annular recess is formed, in which recess a suitably shaped annular projection, on the opposite end of the hub of the adjacent blade, engages.

It is also possible for several or all of the blades of the cutting roller to be embedded in a common synthetic body which forms a hub consisting of one piece. This hub may be constructed hollow or solid. In the latter case the hub of synthetic material has only one central transverse bore for rotatably mounting the cutting roller on an insertable spindle. This makes it possible for the entire cutting roller to be manufactured in one operation, for example by injecting a thermoplastic synthetic material into a mould in which the blades are laid. The synthetic body is preferably so constructed that it has central projections (previously of metal) on its two end surfaces adjacent to the ends of the bore, in order to ensure the necessary spacing between the two end portions of the casing during the rotation of the cutting roller.

A further feature of this embodiment is that the previously used circular disc-shaped blades, the inner peripheries of which extended into the vicinity of the axis, are replaced by comparatively small sheet steel rings, the width of which is less than half, for example only a third, of the radius of the cutting roller. At the same time it is sufficient for attaching the blades to the synthetic body, if the sheet steel rings are engaged by a portion amounting to less than half their depth, for example by a third of their depth, between the edges of the reinforcing discs formed by the synthetic body.

By this feature, not only is a considerable economy in steel sheeting obtained, but the manufacture of the synthetic body by injection into a mould is greatly facilitated, and waste avoided if the blades extend only slightly into the synthetic body and this body is constructed as a solid part.

The invention will now be further described by way of example with reference to the accompanying drawings, in which.

Figure 1:
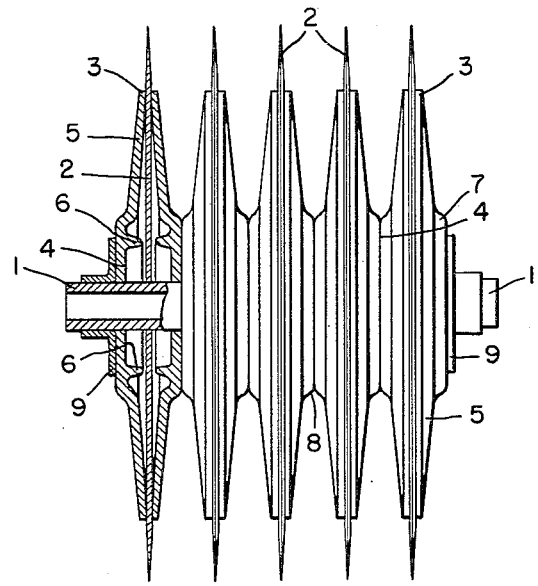
Fig. 1 is a cutting roller shown partly in axial section.

In the example shown in Fig. 1, the cutting blades 2 which consist of thin steel sheeting and are perforated in the centre, are arranged in series on a hollow shaft 1. On both sides of each blade 2 a reinforcing disc 3 of synthetic material is slipped on the shaft 1, so that each blade 2 is clamped and held as far as the vicinity of its periphery. This support of each blade almost to its periphery affords the advantage that very thin steel sheets can be used for the blades, making subsequent grinding unnecessary.

The reinforcing discs 3 are, as may be seen in particular from the cross-section shown in Fig. 1, shaped in such manner as to present plane surface hub portions 4 in the vicinity of the hub, so that portions 4 of adjacent reinforcing discs abut against one another, co-operating to form a hub. The outer regions 5 of the reinforcing discs 3 are however constructed with a slight bevel so that they clamp blades 2 resiliently. On the surface of the hub portion 4 facing the blade a bridging member 6 is formed of such depth that it abuts the blade after a certain amount of deformation of the outer region 5 of the disc 3, and thereby limits the deformation of the reinforcing disc according to its strength, in the event of an excessive axial pressure being exerted when the appliance is assembled. The lateral compaction of the parts 3 and 4 is effected by the clamping discs 9 which are secured on each end of the shaft 1 in a suitable manner which is not described in detail.

Between the plane hub portion 4 and the bevelled outer region 5 there is constructed, on the side of the reinforcing disc remote from the blade, an annular shoulder 7 (Fig. 1) which is shaped so that an annular groove having a comparatively broad base 8 is produced between each pair of closely adjacent reinforcing discs 3 having their hub portions 4 in close juxtaposition. By this means cleaning of the intermediate spaces between the blades 2 is facilitated and the lodging of particles and the like prevented.

Figure 2:
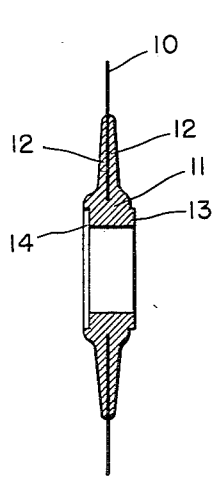
Fig. 2 is a cross-section through an individual blade embedded in a hub portion of synthetic material.
Figure 3:
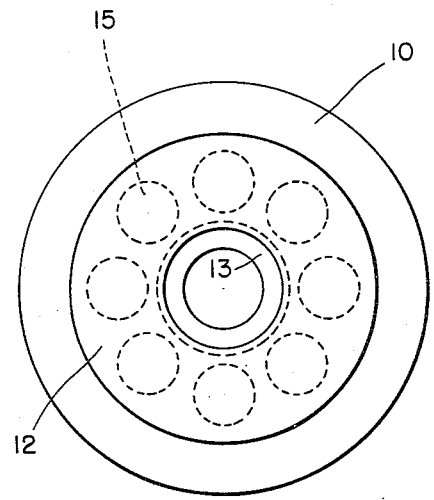
Fig. 3 is a side elevation of the blade shown in Fig. 2.

According to Fig. 2, each blade 10 is cast in or pressed into a hub 11 of synthetic material. The synthetic body extends outwardly at 12 to cover and support both sides of the blade 10 as far as the vicinity of its periphery. The centre hub portion is enlarged and determines the spacing between adjacent blades. One side of the synthetic body 11 is formed with an annular projection 13 to which there corresponds, on the other side, an annular recess 14 into which the projection 13 of the adjacent hub fits. As shown in Fig. 3, the blade 10 can have holes 15 through which the synthetic mass penetrates in order to ensure a reliable attachment.

Figure 4:
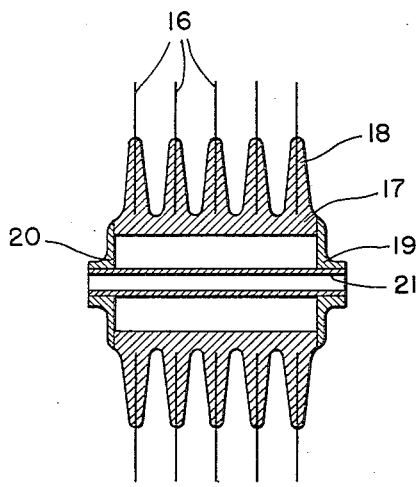
Fig. 4 is an axial section through a cutting roller, with all its blades embedded in a hollow body of synthetic material.

In the example shown in Fig. 4, all the blades 16 of the cutting roller are embedded in a common synthetic body which forms both the annular discs 18 for supporting the thin blades and the hub 17. This body is firmly clamped between two end discs 19 and 20 in the example shown, and thereby secured on a hollow shaft 21.

Figure 5:
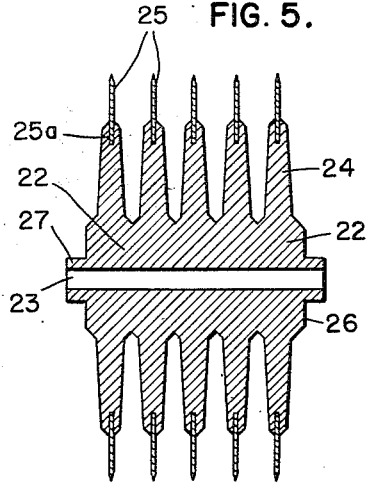
Fig. 5 is an axial section through a cutting roller having a solid hub body made in one piece.
Figure 6:
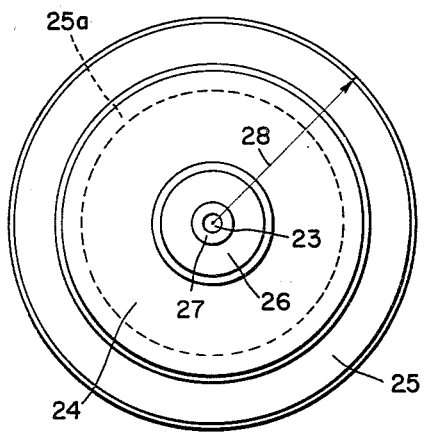
Fig. 6 is the cutting roller of Fig. 5 shown in side elevation.

In the example shown in Figs. 5 and 6, the body 22 of synthetic material carrying the blades 25 is constructed solid and has only one centre transverse bore 23 for the insertion of the spindle (not shown) of the cutting roller. On both end surfaces, the body 22 of synthetic material has central projections 26 and 27 of the bore.

The blades 25 of the construction shown in Figs. 5 and 6 are formed by steel sheet rings, the depth of each of which is equal to about one third (i. e. less than half) of the radius of the cutting roller, said radius being indicated by the arrow 28 in Fig. 6. Furthermore, these rings forming the blades 25 of thin steel sheet are engaged, in the example shown, only to the extent of about a third of their depth, that is by their annular inner portions 25a, in the edge regions of the disc-shaped ribs 24, which are constructed on the synthetic body 22 for embedding and securing the blades 25.

We claim:

1. A cutting roller for culinary and like purposes comprising a rotatable hub and a plurality of metal blades, said hub being formed of a synthetic plastic material, and said blades consisting of sheet steel rings the depth of each of which is less than half the radius of the roller.

2. A cutting roller for culinary and like purposes comprising a rotatable hub of a synthetic plastic material, a plurality of discs integral with said hub and progressively reduced in thickness in a direction radially outwardly of the hub, and thin, circular sheet metal blades concentric with and corresponding in number to the discs, the blades being moulded into the several discs symmetrically in respect to the thickness of the discs and being spaced apart by the hub in a direction axially of the hub.

3. A cutting roller as in claim 2 wherein the discs, at the bases thereof, are spaced apart in a direction axially of the hub.

References Cited in the file of this patent

UNITED STATES PATENTS

| | | |
|---|---|---|
| 559,838 | Black | May 12, 1896 |
| 747,260 | Steltz | Dec. 15, 1903 |
| 748,344 | Busser | Dec. 29, 1903 |
| 1,343,844 | Rapavy | June 15, 1920 |
| 1,932,563 | Thewes | Oct. 31, 1933 |
| 2,076,139 | Doherty et al. | Apr. 6, 1937 |
| 2,382,304 | Foltz et al. | Aug. 14, 1945 |
| 2,672,685 | Walters | Mar. 23, 1954 |